United States Patent
Park et al.

(10) Patent No.: US 11,424,485 B2
(45) Date of Patent: Aug. 23, 2022

(54) LITHIUM SECONDARY BATTERY ELECTROLYTE AND LITHIUM SECONDARY BATTERY COMPRISING SAME

(71) Applicant: SAMSUNG SDI CO., LTD., Yongin-si (KR)

(72) Inventors: Hyejin Park, Yongin-si (KR); Inhaeng Cho, Yongin-si (KR); Sanghoon Kim, Yongin-si (KR); Woo Cheol Shin, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 390 days.

(21) Appl. No.: 16/307,765

(22) PCT Filed: Jun. 30, 2017

(86) PCT No.: PCT/KR2017/006970
§ 371 (c)(1),
(2) Date: Dec. 6, 2018

(87) PCT Pub. No.: WO2018/016767
PCT Pub. Date: Jan. 25, 2018

(65) Prior Publication Data
US 2019/0267673 A1 Aug. 29, 2019

(30) Foreign Application Priority Data
Jul. 22, 2016 (KR) .................. 10-2016-0093506

(51) Int. Cl.
*H01M 4/525* (2010.01)
*H01M 10/0525* (2010.01)
(Continued)

(52) U.S. Cl.
CPC ....... *H01M 10/0569* (2013.01); *H01M 4/525* (2013.01); *H01M 4/587* (2013.01);
(Continued)

(58) Field of Classification Search
CPC ......... H01M 10/0569; H01M 10/0525; H01M 10/0567; H01M 4/525; H01M 4/587; H01M 4/485; H01M 4/5825
See application file for complete search history.

(56) References Cited

U.S. PATENT DOCUMENTS

| | | | | |
|---|---|---|---|---|
| 2004/0096750 A1* | 5/2004 | Kim | ............ | H01M 4/602 429/231.95 |
| 2006/0019170 A1* | 1/2006 | Adachi | ............ | H01M 10/0569 429/329 |

(Continued)

FOREIGN PATENT DOCUMENTS

| CN | 17443 | * | 7/2005 |
|---|---|---|---|
| CN | 1744369 A | | 3/2006 |

(Continued)

OTHER PUBLICATIONS

KR 20160093506, Written_Opinion_(TRANSLATED), dated Dec. 16, 2020 (Year: 2020).*

(Continued)

*Primary Examiner* — Alexander Usyatinsky
(74) *Attorney, Agent, or Firm* — Lee IP Law, P.C.

(57) ABSTRACT

The present disclosure relates to a lithium secondary battery electrolyte and a lithium secondary battery comprising the lithium secondary battery electrolyte, which comprises: a non-aqueous organic solvent including a branched ester-based solvent represented by formula 1; and a lithium salt.

19 Claims, 5 Drawing Sheets

(51) Int. Cl.
*H01M 10/0569* (2010.01)
*H01M 4/587* (2010.01)
*H01M 10/0567* (2010.01)

(52) U.S. Cl.
CPC ... *H01M 10/0525* (2013.01); *H01M 10/0567* (2013.01); *H01M 2300/0037* (2013.01)

(56) References Cited

U.S. PATENT DOCUMENTS

| | | | |
|---|---|---|---|
| 2009/0169976 | A1 | 7/2009 | Takahashi et al. |
| 2010/0304225 | A1* | 12/2010 | Pascaly ............... H01G 11/58 429/342 |
| 2011/0123871 | A1 | 5/2011 | Nakagawa et al. |
| 2013/0122378 | A1 | 5/2013 | Oh et al. |
| 2014/0030609 | A1 | 1/2014 | Abe et al. |
| 2014/0227584 | A1 | 8/2014 | Holstein et al. |
| 2015/0024283 | A1 | 1/2015 | Deguchi |
| 2016/0372792 | A1* | 12/2016 | Zhu ..................... H01M 4/386 |
| 2018/0301759 | A1 | 10/2018 | Dubois et al. |

FOREIGN PATENT DOCUMENTS

| | | | |
|---|---|---|---|
| CN | 101765939 A | | 6/2010 |
| CN | 102544582 A | | 7/2012 |
| CN | 105742709 A | | 7/2016 |
| EP | 1619743 | * | 1/2006 |
| JP | 2000-195544 A | | 7/2000 |
| JP | 2014-089991 A | | 5/2014 |
| KR | 10-2004-0043228 A | | 5/2004 |
| KR | 10-2006-0053931 A | | 5/2006 |
| KR | 10-2010-0051794 A | | 5/2010 |
| KR | 10-2013-0054127 A | | 5/2013 |
| KR | 10-2014-0034187 A | | 3/2014 |
| KR | 10-2014-0060325 A | | 5/2014 |

OTHER PUBLICATIONS

Scifinder Abstract of EP 1619743 A (Year: 2006).*
CN 17443 MT (Year: 2005).*
201780037464,First_Office_Action(PCT)_(TRANSLATED), dated Jan. 15, 2021 (Year: 2021).*
The Decision of KIPO to grant a Patent for Application No. 20160093506 (Year: 2021).*
The Decision of SIPO to grant a Patent for Application No. 201780037464.1 (Year: 2021).*
Chinese Office action dated Jan. 15, 2021 and the Search Report dated Dec. 29, 2020.
Zhao, Ben-hao, et al., "Research on the performance of high-voltage electrolyt with fluoroethylene carbonate", Chinese Battery Industry, vol. 18, No. 1/2, Apr. 2013.
Chinese Notice of Allowance dated Oct. 11, 2021 and Chinese Search Report dated Sep. 22, 2021.

* cited by examiner

LITHIUM SECONDARY BATTERY ELECTROLYTE AND LITHIUM SECONDARY BATTERY COMPRISING SAME

CROSS-REFERENCE TO THE RELATED APPLICATION

This is the U.S. national phase application based on PCT Application No. PCT/KR2017/006970, filed Jun. 30, 2017, which is based on Korean Patent Application No. 10-2016-0093506, filed Jul. 22, 2016, the entire contents of all of which are hereby incorporated by reference.

TECHNICAL FIELD

This disclosure relates to an electrolyte for a lithium secondary battery and a lithium secondary battery comprising the same.

BACKGROUND ART

Lithium secondary batteries that have recently drawn attention as a power source for small portable electronic devices use an organic electrolyte and thereby have twice the discharge voltage of a conventional battery using an alkali aqueous solution, and accordingly have high energy density.

As for a negative active material of a lithium secondary battery, various carbon-based materials such as artificial graphite, natural graphite, and hard carbon that can intercalate and deintercalate lithium have been used.

As for a positive active material, chalcogenide compounds have been mainly used, and examples thereof may be composite metal oxides such as $LiCoO_2$, $LiMn_2O_4$, $LiNiO_2$, $LiNi_{1-x}CO_xO_2$ (0<x<1), $LiMnO_2$, and the like.

As for an electrolyte, a lithium salt dissolved in a non-aqueous solvent such as ethylene carbonate, dimethyl carbonate, diethyl carbonate, and the like is used.

During the initial charge of a lithium secondary battery, lithium ions, which are released from the lithium-transition metal oxide, i.e., the positive electrode are transported into a carbon negative electrode and intercalated thereinto. Because of its high reactivity, lithium reacts with the carbon negative electrode to produce $Li_2CO_3$, LiO, LiOH, etc., thereby forming a thin film on the surface of the negative electrode. This film is referred to as a solid electrolyte interface (SEI) film. The SEI film formed during the initial charge prevents the reaction between lithium ions and carbon the carbon negative electrode or other materials during charge and discharge. In addition, it also acts as an ion tunnel, allowing the passage of lithium ions. The ion tunnel prevents disintegration of the structure of the carbon negative electrode, which is caused by co-intercalation of organic solvents having a high molecular weight along with solvated lithium ions into the carbon negative electrode. Once the SEI film is formed, lithium ions do not react again with the carbon electrode or other materials, such that the amount of lithium ions is reversibly maintained.

However, gases are generated inside a battery using a carbonate-based organic solvent due to decomposition of a carbonate-based organic solvent during the SEI film-forming reaction. These gases include $H_2$, CO, $CO_2$, $CH_4$, $C_2H_6$, $O_3H_8$, $C_3H_6$, etc. depending on the types of non-aqueous organic solvents and negative active materials used. Due to the gases generated inside the battery, the battery is swollen in a thickness direction when it is charged, and when the battery is fully charged and kept at a high temperature, the SEI film is gradually decomposed by the electrochemical energy and heat energy that increase as time passes, continuously causing a reaction with a new adjacent surface of the negative electrode with exposed electrolyte solution. The continuous generation of gases increases the internal pressure of the inside of the battery.

There are needs for development of a novel electrolyte composition capable of changing a SEI film-forming reaction and suppressing increase of internal pressure, and simultaneously improving a capacity retention when being placed at a high temperature.

DISCLOSURE

Technical Problem

An embodiment of the present invention provides an electrolyte for a lithium secondary battery having improved high-voltage, high-temperature characteristics.

Another embodiment of the present invention provides a lithium secondary battery including the electrolyte for a lithium secondary battery.

Technical Solution

An embodiment of the present invention provides an electrolyte for a lithium secondary battery including a non-aqueous organic solvent including a branched ester-based solvent represented by Chemical Formula 1; and a lithium salt.

[Chemical Formula 1]

In Chemical Formula 1,
$R^1$ to $R^4$ are the same or different and are independently a C1 to C5 linear or branched alkyl group.

The branched ester-based solvent represented by Chemical Formula 1 may be selected from the group consisting of a compound represented by Chemical Formula 2-1 to a compound represented by Chemical Formula 2-8, and a combination thereof.

[Chemical Formula 2-1]

[Chemical Formula 2-2]

[Chemical Formula 2-3]

-continued

[Chemical Formula 2-4]

[Chemical Formula 2-5]

[Chemical Formula 2-6]

[Chemical Formula 2-7]

[Chemical Formula 2-8]

The non-aqueous organic solvent may further include a solvent selected from the group consisting of a carbonate-based solvent, a linear ester-based solvent represented by Chemical Formula 3, and a combination thereof.

[Chemical Formula 3]

In Chemical Formula 3, $R^5$ and $R^6$ are the same or different and are independently a C1 to C5 linear alkyl group.

The carbonate-based solvent may be selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and a combination thereof.

The linear ester-based solvent represented by Chemical Formula 3 may be selected from the group consisting of methylacetate, ethylacetate, n-propylacetate, methylpropionate, ethylpropionate, n-propylpropionate, methylbutanoate, ethylbutanoate, n-propylbutanoate, and a combination thereof.

The non-aqueous organic solvent may include about 10 wt % to about 40 wt % of the branched ester-based solvent represented by Chemical Formula 1 based on a total amount of the non-aqueous organic solvent.

The non-aqueous organic solvent may include the branched ester-based solvent represented by Chemical Formula 1, the carbonate-based solvent, and the linear ester-based solvent represented by Chemical Formula 3, wherein it includes about 100 parts by weight to about 400 parts by weight of the carbonate-based solvent and about 50 parts by weight to about 150 parts by weight of the linear ester-based solvent represented by Chemical Formula 3 based on 100 parts by weight of the branched ester-based solvent represented by Chemical Formula 1.

The electrolyte for a lithium secondary battery may further include an electrolyte additive for a lithium secondary battery.

The electrolyte additive for a lithium secondary battery selected from the group consisting of an ethylenecarbonate-based compound represented by Chemical Formula 5, alkanesultone, vinylene carbonate, and a combination thereof.

[Chemical Formula 5]

In Chemical Formula 5, $R^7$ and $R^8$ are the same or different and are independently selected from the group consisting of hydrogen, halogen, a cyano group (CN), a nitro group ($NO_2$), a vinyl group, and fluorinated C1 to C5 linear or branched alkyl group, provided that both of $R^7$ and $R^8$ are not hydrogen.

The alkanesultone may be selected from the group consisting of 1,3-propanesultone, butanesultone, 1,3-(1-propenesultone), and a combination thereof.

The electrolyte for a lithium secondary battery may include about 6 wt % to about 13 wt % of the electrolyte additive for a lithium secondary battery based on a total weight of the electrolyte for a lithium secondary battery.

The electrolyte for a lithium secondary battery may include fluoroethylene carbonate (FEC), 1,3-propanesultone (1,3-PS), and vinylethylene carbonate (VEC) as the electrolyte additive for a lithium secondary battery.

Herein, the electrolyte additive for a lithium secondary battery may include about 1,000 parts by weight to about 2,000 parts by weight of the fluoroethylene carbonate (FEC) and about 100 parts by weight to about 500 parts by weight of the 1,3-propanesultone based on 100 parts by weight of the vinylethylene carbonate (VEC).

Another embodiment of the present invention provides a lithium secondary battery includes a positive electrode including a positive active material; a negative electrode including a negative active material; and the electrolyte for a lithium secondary battery.

The positive active material may be selected from compounds represented by the following chemical formulae. $Li_aAl_{1-b}D_bE_2$ (wherein, in the chemical formula, $0.90 \leq a \leq 1.8$, $0 \leq b \leq 0.5$); $LiaG_{1-b}D_bO_{2-c}E_c$ (wherein, in the chemical formula, $0.90 \leq a \leq 1.8$, $0 \leq b \leq 0.5$, $0 \leq c \leq 0.05$); $LiG_{2-b}D_bO_{4-c}E_c$ (wherein, in the chemical formula, $0 \leq b \leq 0.5$, $0 \leq c \leq 0.05$); $LiaNi_{1-b-c}Co_bD_cE_\alpha$ (wherein, in the chemical formula, $0.90 \leq a \leq 1.8$, $0 \leq b \leq 0.5$, $0 \leq c \leq 0.05$, $0 < \alpha \leq 2$); $LiaNi_{1-b-c}Co_bD_cO_{2-\alpha}J_\alpha$ (wherein, in the chemical formula, $0.90 \leq a \leq 1.8$, $0 \leq b \leq 0.5$, $0 \leq c \leq 0.05$, $0 < \alpha < 2$);

LiaNi$_{1-b-c}$Co$_b$D$_c$O$_{2-\alpha}$J$_2$ (wherein, in the chemical formula, 0.90≤a≤1.8, 0≤b≤0.5, 0≤c≤0.05, 0<α<2); LiaNi$_{1-b-c}$Mn$_b$D$_c$E$_\alpha$ (wherein, in the chemical formula, 0.90≤a≤1.8, 0≤b≤0.5, 0≤c≤0.05, 0<α≤2); LiaNi$_{1-b-c}$Mn$_b$D$_c$O$_{2-\alpha}$J$_\alpha$ (wherein, in the chemical formula, 0.90≤a≤1.8, 0≤b≤0.5, 0≤c≤0.05, 0<α<2); Li$_a$Ni$_{1-b-c}$Mn$_b$D$_c$O$_{2-\alpha}$J$_2$ (wherein, in the chemical formula, 0.90≤a≤1.8, 0≤b≤0.5, 0≤c≤0.05, 0<α<2); LiaNi$_b$G$_c$L$_d$O$_2$ (wherein, in the chemical formula, 0.90≤a≤1.8, 0≤b≤0.9, 0≤c≤0.5, 0.001≤d≤0.2); LiaNi$_b$G$_c$O$_2$ (wherein, in the chemical formula, 0.90≤a≤1.8, 0≤b≤0.9, 0≤c≤0.5); LiaNi$_b$Co$_c$Mn$_d$L$_e$O$_2$ (wherein, in the chemical formula, 0.90≤a≤1.8, 0≤b≤0.9, 0≤c≤0.5, 0≤d≤0.5, 0.001≤e≤0.2); LiaNi$_b$Co$_c$Mn$_d$O$_2$ (wherein, in the chemical formula, 0.90≤a≤1.8, 0≤b≤0.9, 0≤c≤0.5, 0≤d≤0.5); Li$_a$NiL$_b$O$_2$ (wherein, in the chemical formula, 0.90≤a≤1.8, 0.001≤b≤0.2); Li$_a$CoL$_b$O$_2$ (wherein, in the chemical formula, 0.90≤a≤1.8, 0.001≤b≤0.2); Li$_a$MnL$_b$O$_2$ (wherein, in the chemical formula, 0.90≤a≤1.8, 0.001≤b≤0.2); Li$_a$Mn$_2$L$_b$O$_4$ (wherein, in the chemical formula, 0.90≤a≤1.8, 0.001≤b≤0.2); Li$_a$Mn$_2$O$_4$ (wherein, in the chemical formula, 0.90≤a≤1.8); MO$_2$; MS$_2$; LiMS$_2$; V$_2$O$_5$; LiV$_2$O$_5$; LiQO$_2$; LiNiVO$_4$; Li$_{(3-f)}$T$_2$(PO$_4$)$_3$ (wherein, in the chemical formula, 0≤f≤2); Li$_{(3-f)}$Fe$_2$(PO$_4$)$_3$ (wherein, in the chemical formula, 0≤f≤2); LiFePO$_4$ wherein the chemical formulae, A is selected from the group consisting of Ni, Co, Mn, and a combination thereof, D is selected from the group consisting of Al, Ni, Co, Mn, Cr, Fe, Mg, Sr, V, a rare earth element, and a combination thereof, E is selected from the group consisting of O, F, S, P, and a combination thereof, G is selected from the group consisting of Co, Mn, and a combination thereof, J is selected from the group consisting of F, S, P, and a combination thereof, L is a transition metal or a lanthanide element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Mn, La, Ce, and a combination thereof, M is selected from the group consisting of Ti, Mo, Mn, and a combination thereof, Q is selected from the group consisting of Cr, V, Fe, Sc, Ti, Y, and a combination thereof, and T is selected from the group consisting of V, Cr, Mn, Co, Ni, Cu, and a combination thereof.

Specifically, the positive active material may be LiCoO$_2$.

The negative active material may be graphite.

The lithium secondary battery may have a charge voltage of about 4.3 V or greater.

Specifically, the lithium secondary battery may have a charge voltage of about 4.4 V to about 4.5 V.

Other embodiments of the present invention are included in the following detailed description.

Advantageous Effects

The electrolyte for a lithium secondary battery according to an embodiment of the present invention may have improved high-voltage, high-temperature characteristics, and thereby improve high-voltage, high-temperature characteristics of the lithium secondary battery including the same.

MODE FOR INVENTION

Hereinafter, embodiments of the present invention are described in detail. However, these embodiments are exemplary, the present invention is not limited thereto and the present invention is defined by the scope of claims.

In the present specification, when specific definition is not otherwise provided, "alkyl group" refers to a C1 to C5 linear or branched alkyl group, specifically a C1 to C3 linear or branched alkyl group, and more specifically a C1 or C2 alkyl group.

In the present specification, when specific definition is not otherwise provided, "combination" refers to a mixture or an alloy.

According to an embodiment of the present invention, an electrolyte for a lithium secondary battery includes a non-aqueous organic solvent including a branched ester-based solvent represented by Chemical Formula 1; and a lithium salt.

[Chemical Formula 1]

In Chemical Formula 1,

R$^1$ to R$^4$ are the same or different and are independently a C1 to C5 linear or branched alkyl group, specifically a C1 to C3 linear or branched alkyl group, and more specifically a C1 or C2 alkyl group.

The non-aqueous organic solvent serves as a medium for transmitting ions taking part in the electrochemical reaction of a lithium secondary battery.

When the electrolyte for a lithium secondary battery includes the non-aqueous organic solvent including the branched ester-based solvent represented by Chemical Formula 1, a bulky side chain of the branched ester-based solvent represented by Chemical Formula 1 protects alpha-carbon from attack of a nucleophile and thus may prevent a side reaction and also, suppresses decomposition of the non-aqueous organic solvent during the charge/discharge at a high voltage and thus may reduce a thickness expansion ratio and an internal resistance (IR) increase rate of a lithium secondary battery and in addition, effectively improve capacity characteristics and cycle-life characteristics of the lithium secondary battery.

Specifically, the branched ester-based solvent represented by Chemical Formula 1 may be selected from the group consisting of a compound represented by Chemical Formula 2-1 to a compound represented by Chemical Formula 2-8, and a combination thereof but the branched ester-based solvent represented by Chemical Formula 1 is not limited thereto.

[Chemical Formula 2-1]

[Chemical Formula 2-2]

[Chemical Formula 2-3]

[Chemical Formula 2-4]

[Chemical Formula 2-5]

[Chemical Formula 2-6]

[Chemical Formula 2-7]

[Chemical Formula 2-8]

The non-aqueous organic solvent may further include a solvent selected from the group consisting of a carbonate-based solvent, a linear ester-based solvent represented by Chemical Formula 3, and a combination thereof in addition to the branched ester-based solvent represented by Chemical Formula 1.

[Chemical Formula 3]

In Chemical Formula 3, $R^5$ and $R^6$ are the same or different and are independently a C1 to C5 linear alkyl group, specifically a C1 to C3 linear alkyl group, and more specifically a C1 or C2 alkyl group.

The carbonate-based solvent may be selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and a combination thereof.

The linear ester-based solvent represented by Chemical Formula 3 may be selected from the group consisting of methylacetate, ethylacetate, n-propylacetate, methylpropionate, ethylpropionate (EP), n-propylpropionate, methylbutanoate, ethylbutanoate, n-propylbutanoate, and a combination thereof.

When the non-aqueous organic solvent further includes a solvent selected from the group consisting of the carbonate-based solvent, the linear ester-based solvent represented by Chemical Formula 3, and a combination thereof in addition to the branched ester-based solvent represented by Chemical Formula 1, ion conductivity may be effectively improved.

The non-aqueous organic solvent may include the branched ester-based solvent represented by Chemical Formula 1 in an amount of about 10 wt % to about 40 wt %, specifically about 10 wt % to about 30 wt %, and more specifically about 15 wt % to about 20 wt % based on a total amount of the non-aqueous organic solvent. When the non-aqueous organic solvent includes the branched ester-based solvent represented by Chemical Formula 1 within the ranges, a thickness expansion ratio and an internal resistance (IR) increase rate of the lithium secondary battery may be effectively reduced by effectively preventing a side reaction and effectively suppressing decomposition of the non-aqueous organic solvent during the charge/discharge at a high voltage, and in addition, capacity characteristics and cycle-life characteristics of the lithium secondary battery may be effectively improved.

When the non-aqueous organic solvent includes the branched ester-based solvent represented by Chemical Formula 1, the carbonate-based solvent, and the linear ester-based solvent represented by Chemical Formula 3, the non-aqueous organic solvent includes the carbonate-based solvent in amount of about 100 parts by weight to about 400 parts by weight, specifically about 150 parts by weight to about 350 parts by weight, and more specifically about 200 parts by weight to about 300 parts by weight and the linear ester-based solvent represented by Chemical Formula 3 in an amount of about 50 parts by weight to about 150 parts by weight, specifically about 75 parts by weight to about 150 parts by weight, and more specifically about 75 parts by weight to about 100 parts by weight, based on 100 parts by weight of the branched ester-based solvent represented by Chemical Formula 1. When the non-aqueous organic solvent has a composition within the ranges, a thickness expansion ratio and an internal resistance (IR) increase rate of the lithium secondary battery may be effectively reduced by effectively suppressing decomposition of the non-aqueous organic solvent during the charge/discharge at a high voltage, and in addition, capacity characteristics and cycle-life characteristics of the lithium secondary battery may be effectively improved.

The non-aqueous organic solvent may further include a cyclic ester-based solvent, an ether-based solvent, a ketone-based solvent, an alcohol-based solvent, an aprotic solvent, or an aromatic hydrocarbon-based solvent as needed, but is not limited thereto.

The cyclic ester-based solvent may be γ-butyrolactone (gamma-butyrolactone), decanolide, valerolactone, mevalonolactone, caprolactone, and the like.

The ether-based solvent may be dimethyl ether, dibutyl ether, tetraglyme, diglyme, dimethoxyethane, 2-methyltetrahydrofuran, tetrahydrofuran (THF), and the like.

The ketone-based solvent may be cyclohexanone, and the like.

The alcohol-based solvent may be ethanol, isopropyl alcohol, and the like.

The aprotic solvent may be nitriles represented by R—CN (wherein R may include a C2 to C20 linear, branched, or cyclic hydrocarbon group, a double bond, an aromatic ring, or an ether bond), and the like, amides such as dimethyl formamide (DMF), dimethyl acetamide (DMAC), and the like, dioxolanes such as 1,3-dioxolane, and the like, sulfolanes, cycloalkanes such as cyclohexane, and the like.

The aromatic hydrocarbon-based solvent may use an aromatic hydrocarbon-based compound represented by Chemical Formula 4.

[Chemical Formula 4]

In Chemical Formula 4, $R^{11}$ to $R^{16}$ are the same or different and are independently selected from the group consisting of hydrogen, a halogen, a C1 to C10 alkyl group, a C1 to C10 haloalkyl group, and a combination thereof.

Specific examples of the aromatic hydrocarbon-based solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The solvents that are further included in the non-aqueous organic solvent may be used alone or in a mixture and when the organic solvent is used in a mixture, a mixture ratio may be controlled in accordance with a desirable battery performance.

The lithium salt is dissolved in the non-aqueous organic solvent, acts as a source of lithium ions in a lithium secondary battery to operate a lithium secondary battery, and promotes lithium ion transportation between the positive electrode and the negative electrode. In addition, the lithium salt may act as a supporting electrolytic salt.

The lithium salt may include one selected from $LiPF_6$, $LiBF_4$, $LiSbF_6$, $LiAsF_6$, $LiCF_3SO_3$, $LiN(SO_2C_2F_5)_2$, $LiN(SO_2CF_3)_2$, $LiN(SO_3C_2F_5)_2$, $LiC_4F_9SO_3$, $LiClO_4$, $LiAlO_4$, $LiAlO_2$, $LiAlCl_4$, $LiN(C_xF_{2x+1}SO_2)(C_yF_{2y+1}SO_2)$ (wherein, x and y are natural numbers), LiCl, LiJ, $LiB(C_2O_4)_2$ [lithium bis(oxalato) borate, LiBOB)], and a combination thereof, but is not limited thereto.

A concentration of the lithium salt may be about 0.1 M to about 2.0 M, and specifically about 0.5 M to about 2.0 M. When the concentration of the lithium salt is within the range, an electrolyte may have excellent performance and effective lithium ion mobility due to optimal electrolyte conductivity and viscosity.

The electrolyte for a lithium secondary battery may further include an electrolyte additive for a lithium secondary battery in order to improve cycle life of a battery.

The electrolyte additive for a lithium secondary battery may be selected from the group consisting of an ethylenecarbonate-based compound represented by Chemical Formula 5, alkanesultone, vinylenecarbonate, and a combination thereof.

[Chemical Formula 5]

In Chemical Formula 5, $R^7$ and $R^8$ are the same or different and are independently selected from the group consisting of hydrogen, halogen, a cyano group (CN), a nitro group ($NO_2$), a vinyl group, and fluorinated C1 to C5 linear or branched alkyl group, provided that both of $R^7$ and $R^8$ are not hydrogen.

The ethylenecarbonate-based compound represented by Chemical Formula 5 may be selected from the group consisting of difluoroethylenecarbonate, chloroethylenecarbonate, dichloroethylenecarbonate, bromoethylenecarbonate, dibromoethylenecarbonate, nitroethylenecarbonate, cyanoethylenecarbonate, fluoroethylene carbonate (FEC), vinylethylene carbonate (VEC), and a combination thereof, but is not limited thereto.

The alkanesultone may be selected from the group consisting of 1,3-propanesultone (1,3-PS), butanesultone, 1,3-(1-propenesultone), and a combination thereof but is not limited thereto.

The electrolyte for a lithium secondary battery may include about 6 wt % to about 13 wt %, specifically about 6 wt % to about 10 wt %, and more specifically about 8 wt % to about 9.5 wt % of the electrolyte additive for a lithium secondary battery based on a total weight of the electrolyte for a lithium secondary battery. When the amount of the electrolyte additive for a lithium secondary battery is within the range, cycle-life characteristics of a lithium secondary battery may be effectively improved.

Specifically, the electrolyte for a lithium secondary battery may include fluoroethylene carbonate (FEC), 1,3-propanesultone (1,3-PS) and vinylethylene carbonate (VEC) as the electrolyte additive for a lithium secondary battery. When the electrolyte for a lithium secondary battery include the electrolyte additive for a lithium secondary battery having the above composition, cycle-life characteristics may be improved and a thickness expansion ratio of a lithium secondary battery may be decreased.

Herein, the electrolyte additive for a lithium secondary battery may include the fluoroethylene carbonate (FEC) in an amount of about 1,000 parts by weight to about 2,000 parts by weight, specifically about 1,000 parts by weight to about 1,400 parts by weight, and more specifically about 1,200 parts by weight to about 1,400 parts by weight and the 1,3-propanesultone in an amount of about 100 parts by weight to about 500 parts by weight, specifically about 200 parts by weight to about 500 parts by weight, and more specifically about 400 parts by weight to about 500 parts by weight based on 100 parts by weight of the vinylethylene carbonate (VEC). When an amount ratio of each component of the electrolyte additive for a lithium secondary battery is within the range, cycle-life characteristics may be improved effectively.

Another embodiment of the present invention provides a lithium secondary battery including a positive electrode including a positive active material; a negative electrode including a negative active material; and the electrolyte for a lithium secondary battery.

The positive electrode includes a positive current collector and a positive active material layer disposed on the positive current collector and the positive active material layer includes a positive active material.

The positive active material may include compounds (lithiated intercalation compounds) that can reversibly intercalate and deintercalate lithium ions.

Specifically, the positive active material may be one of compound represented by the following chemical formulae, but is not limited thereto.

$Li_aA_{1-b}D_bE_2$ (wherein, in the chemical formula, $0.90 \leq a \leq 1.8$, $0 \leq b \leq 0.5$); $Li_aG_{1-b}D_bO_{2-c}E_c$ (wherein, in the chemical formula, $0.90 \leq a \leq 1.8$, $0 \leq b \leq 0.5$, $0 \leq c \leq 0.05$); $LiG_{2-b}D_bO_{4-c}E_c$ (wherein, in the chemical formula, $0 \leq b \leq 0.5$, $0 \leq c \leq 0.05$); $LiaNi_{1-b-c}Co_bD_cE_\alpha$ (wherein, in the chemical formula, $0.90 \leq a \leq 1.8$, $0 \leq b \leq 0.5$, $0 \leq c \leq 0.05$, $0 < \alpha \leq 2$); $LiaNi_{1-b-c}Co_bD_cO_{2-\alpha}J_\alpha$ (wherein, in the chemical formula, $0.90 \leq a \leq 1.8$, $0 \leq b \leq 0.5$, $0 \leq c \leq 0.05$, $0 < \alpha < 2$); $LiaNi_{1-b-c}Co_bD_cO_{2-\alpha}J_2$ (wherein, in the chemical formula, $0.90 \leq a \leq 1.8$, $0 \leq b \leq 0.5$, $0 \leq c \leq 0.05$, $0 < \alpha < 2$); $LiaNi_{1-b-c}Mn_bD_cE_\alpha$ (wherein, in the chemical formula, $0.90 \leq a \leq 1.8$, $0 \leq b \leq 0.5$, $0 \leq c \leq 0.05$, $0 < \alpha \leq 2$); $LiaNi_{1-b-c}Mn_bD_cO_{2-\alpha}J_\alpha$ (wherein, in the chemical formula, $0.90 \leq a \leq 1.8$, $0 \leq b \leq 0.5$, $0 \leq c \leq 0.05$, $0 < \alpha < 2$); $LiaNi_{1-b-c}Mn_bD_cO_{2-\alpha}J_2$ (wherein, in the chemical formula, $0.90 \leq a \leq 1.8$, $0 \leq b \leq 0.5$, $0 \leq c \leq 0.05$, $0 < \alpha < 2$); $Li_aNi_bG_cL_dO_2$ (wherein, in the chemical formula, $0.90 \leq a \leq 1.8$, $0 b \leq 0.9$, $0 c \leq 0.5$, $0.001 \leq d \leq 0.2$); $Li_aNi_bG_cO_2$ (wherein, in the chemical formula, $0.90 \leq a \leq 1.8$, $0 \leq b \leq 0.9$, $0 \leq c \leq 0.5$); $Li_aNi_bCo_cMn_dL_eO_2$ (wherein, in the chemical formula, $0.90 \leq a \leq 1.8$, $0 \leq b \leq 0.9$, $0 \leq c \leq 0.5$, $0 \leq d \leq 0.5$, $0.001 \leq e \leq 0.2$); $Li_aNi_bCo_cMn_dO_2$ (wherein, in the chemical formula, $0.90 \leq a \leq 1.8$, $0 \leq b \leq 0.9$, $0 \leq c \leq 0.5$, $0 \leq d \leq 0.5$); $Li_aNiL_bO_2$ (wherein, in the chemical formula, $0.90 \leq a \leq 1.8$, $0.001 \leq b \leq 0.2$); $Li_aCoL_bO_2$ (wherein, in the chemical formula, $0.90 \leq a \leq 1.8$, $0.001 \leq b \leq 0.2$); $Li_aMnL_bO_2$ (wherein, in the chemical formula, $0.90 \leq a \leq 1.8$, $0.001 \leq b \leq 0.2$); $Li_aMn_2L_bO_4$ (wherein, in the chemical formula, $0.90 \leq a \leq 1.8$, $0.001 \leq b \leq 0.2$); $Li_aMn_2O_4$ (wherein, in the chemical formula, $0.90 \leq a \leq 1.8$); $MO_2$; $MS_2$; $LiMS_2$; $V_2O_5$; $LiV_2O_5$; $LiQO_2$; $LiNiVO_4$; $Li_{(3-f)}T_2(PO_4)_3$ (wherein, in the chemical formula, $0 \leq f \leq 2$); $Li_{(3-f)}Fe_2(PO_4)_3$ (wherein, in the chemical formula, $0 \leq f \leq 2$); $LiFePO_4$ wherein the chemical formulae, A is selected from the group consisting of Ni, Co, Mn, and a combination thereof, D is selected from the group consisting of Al, Ni, Co, Mn, Cr, Fe, Mg, Sr, V, a rare earth element, and a combination thereof, E is selected from the group consisting of O, F, S, P, and a combination thereof, G is selected from the group consisting of Co, Mn, and a combination thereof, J is selected from the group consisting of F, S, P, and a combination thereof, L is a transition metal or a lanthanide element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Mn, La, Ce, and a combination thereof, M is selected from the group consisting of Ti, Mo, Mn, and a combination thereof, Q is selected from the group consisting of Cr, V, Fe, Sc, Ti, Y, and a combination thereof, and T is selected from the group consisting of V, Cr, Mn, Co, Ni, Cu, and a combination thereof.

More specific examples of the positive active material may be $LiCoO_2$. When $LiCoO_2$ is included as the positive active material, high-pressure, high temperature characteristics of a lithium secondary battery may be improved effectively.

The positive active material may include the positive active material with the coating layer, or a compound of the active material and the active material coated with the coating layer. The coating layer may include at least one coating element compound selected from the group consisting of an oxide and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and a combination thereof. The coating process may include any conventional processes as long as it does not cause any side effects on the properties of the positive active material (e.g., spray coating, immersing), which is well known to persons having ordinary skill in this art, so a detailed description thereof is omitted.

The positive active material layer further includes a binder and a conductive material.

The binder improves binding properties of the positive active material particles to each other and to a current collector and examples of the binder include at least one of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, a styrene-butadiene rubber, an acrylated styrene-butadiene rubber, an epoxy resin, nylon, and the like, but is not limited thereto.

The conductive material improves electrical conductivity of a negative electrode, any electrically conductive material can be used as a conductive agent unless it causes a chemical change, and examples of the conductive material include at least one selected from natural graphite, artificial graphite, carbon black, Super-P (MMM company), acetylene black, ketjen black, hard carbon obtained through sintering at a high temperature), soft carbon (carbon obtained through sintering at a low temperature), a carbon fiber, a metal powder or a metal fiber including copper, nickel, aluminum, silver, and the like; a conductive polymer such as a polyphenylene derivative and the like; or a mixture thereof.

The positive current collector may use aluminum (Al) but is not limited thereto.

The negative electrode includes a current collector and a negative active material layer disposed thereon. The negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, and the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, Sn, Ti, Ag, Cd, Ga, Bi, and a combination thereof.

The material being capable of doping and dedoping lithium may include Si, $SiO_x$ ($0<x<2$), a Si—Y alloy (wherein Y is an element selected from the group consisting of an alkali metal, an alkaline-earth metal, Group 13 to 16 elements, a transition metal, a rare earth element, and a combination thereof, and not Si), Sn, $SnO_2$, a Sn—C composite, Sn—Y (wherein Y is an element selected from the group consisting of an alkali metal, an alkaline-earth metal, Group 13 to 16 elements, a transition metal, a rare earth element, and a combination thereof and not Sn), at least one of these materials may be mixed with $SiO_2$, and in addition, carbon may further deposited on the surface of the material being capable of doping lithium. Coating the surface of the above materials with carbon may be performed by decomposing such organic materials as ethylene, tetrahydrofuran (THF), and cyclohexanone at high temperature of 800° C. or higher in vacuum in the presence of the above materials, but is not limited thereto. The elements Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, and the like.

More specific examples of the negative active material may be graphite. When graphite is included as the negative active material, high-pressure, high temperature characteristics of a lithium secondary battery may be improved effectively.

The negative active material layer may include a binder and optionally a conductive material.

The binder improves binding properties of negative active material particles with one another and with a current collector and specific examples may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material improves electrical conductivity of a negative electrode, any electrically conductive material can be used as a conductive agent unless it causes a chemical change, and examples thereof may include a carbon-based material such as natural graphite, artificial graphite, carbon black, Super-P (MMM company), acetylene black, ketjen black, hard carbon, soft carbon, a carbon fiber, and the like; a metal powder or a metal fiber including copper, nickel, aluminum, silver, and the like; a conductive polymer such as a polyphenylene derivative and the like; or a mixture thereof.

The current collector may be selected from the group consisting of a copper foil, a nickel foil, a stainless steel foil, a titanium foil, a nickel foam, a copper foam, a polymer substrate coated with a conductive metal, and a combination thereof.

The negative and positive electrodes may be fabricated by a method including mixing the active material, a conductive material, and a binder into an active material composition, and coating the composition on a current collector. The electrode manufacturing method is well known, and thus is not described in detail in the present specification. The solvent includes N-methylpyrrolidone and the like, but is not limited thereto.

A charge voltage of the lithium secondary battery may be about 4.3 V or greater, specifically about 4.4 V to about 4.5 V, and more specifically about 4.45 V to about 4.5 V but is not limited thereto. A lithium secondary battery including the electrolyte for a lithium secondary battery according to an embodiment of the present invention may be efficiently operated at a high charge voltage within the ranges.

The lithium secondary battery may further include a separator between the positive electrode and negative electrode. Such a separator may include polyethylene, polypropylene, polyvinylidene fluoride, or multi-layers thereof such as a polyethylene/polypropylene double-layered separator, a polyethylene/polypropylene/polyethylene triple-layered separator, and a polypropylene/polyethylene/polypropylene triple-layered separator.

The lithium secondary battery may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and manufacturing methods for lithium ion batteries pertaining to this disclosure are well known in the art.

Figure 1:
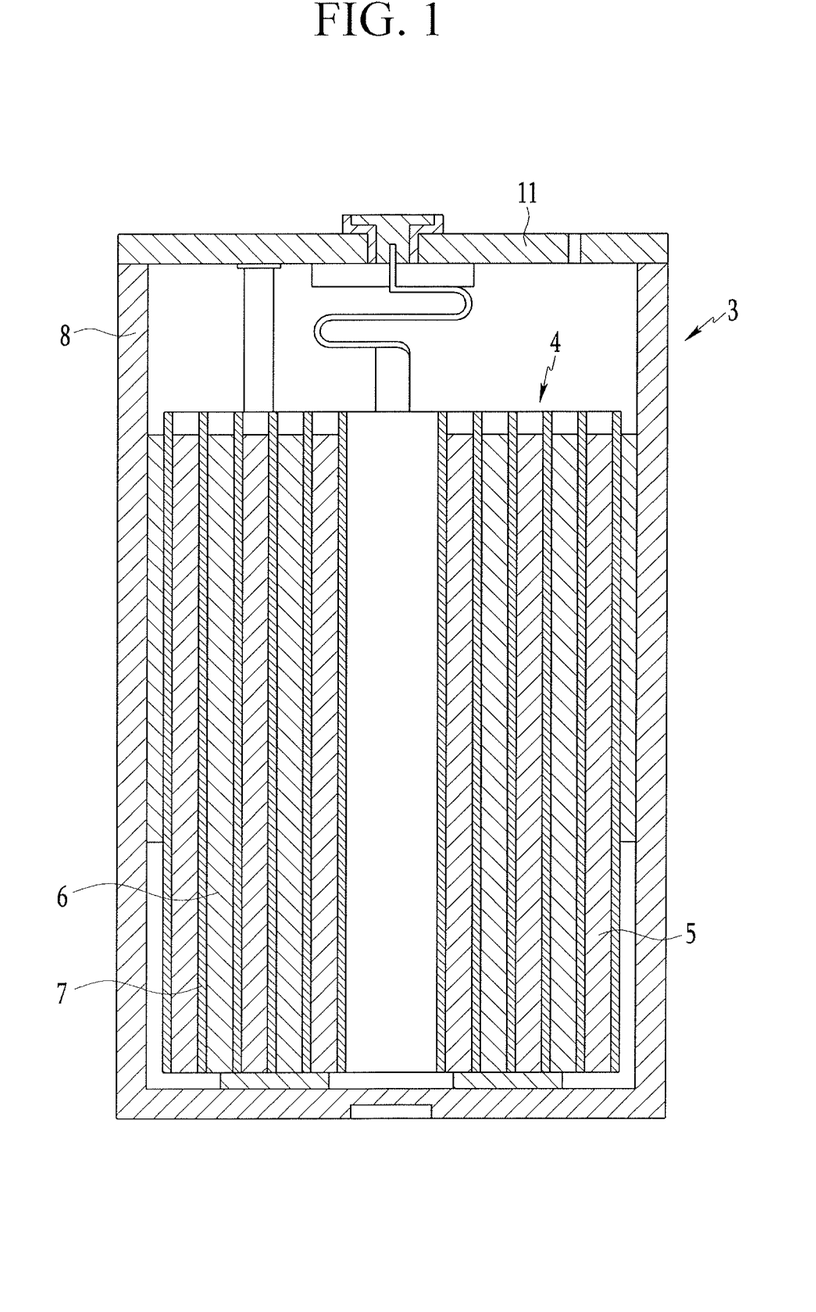
FIG. 1 is a schematic view showing a lithium secondary battery according to an embodiment.

FIG. 1 is a schematic view of a representative structure of a lithium secondary battery of the present invention. As shown in FIG. 1, the lithium secondary battery 3 is a prismatic battery that includes an electrode assembly 4 including a positive electrode 5, a negative electrode 6, and a separator 7 disposed between the positive electrode 5 and the negative electrode 6, in a battery case 8, an electrolyte solution injected through the upper part of the case, and a cap plate 11 sealing the battery. The lithium secondary battery of the present invention is not limited to a prismatic shape, but may have a cylindrical, coin-type, or pouch shape as long as the lithium secondary battery including the electrolyte for a lithium secondary battery according to an embodiment of the present invention can be operated.

EXAMPLES

Hereinafter, examples of the present invention and comparative examples are described. These examples, however, are not in any sense to be interpreted as limiting the scope of the invention.

Preparation Example 1: Preparation of Electrolyte for Lithium Secondary Battery An electrolyte was prepared by mixing ethylene carbonate (EC), ethylpropionate (EP), diethyl carbonate (DEC), and ethyl t-butylacetate (the compound represented by Chemical Formula 2-1) as a non-aqueous organic solvent in a weight ratio of 3:2:3:2 (ethylenecarbonate:ethylpropionate:diethylcarbonate:ethyl t-butylacetate), mixing the mixture with 0.9 M LiPF$_6$, and adding 6 wt % of fluoroethylene carbonate (FEC), 2.5 wt % of 1,3-propanesultone (1,3-PS), and 0.5 wt % of vinylethylene carbonate (VEC) as an additive based on the total weight of the electrolyte thereto.

Comparative Preparation Example 1: Preparation of Electrolyte for Lithium Secondary Battery An electrolyte was prepared by mixing ethylene carbonate (EC), ethylpropionate (EP), and diethyl carbonate (DEC) as a non-aqueous organic solvent in a weight ratio of 3:2:5 (ethylenecarbonate:ethylpropionate:diethylcarbonate), mixing the mixture with 0.9 M LiPF$_6$, and adding 6 wt % of fluoroethylene carbonate (FEC), 2.5 wt % of 1,3-propanesultone (1,3-PS), and 0.5 wt % of vinylethylene carbonate (VEC) as an additive based on the total weight of the electrolyte.

Comparative Preparation Example 2: Preparation of Electrolyte for Lithium Secondary Battery An electrolyte was prepared by mixing ethylene carbonate (EC), ethylmethyl carbonate (EMC), and diethyl carbonate (DEC) as a non-aqueous organic solvent in a weight ratio of 3:2:5 (ethylenecarbonate:ethylmethylcarbonate:diethylcarbonate), mixing the mixture with 0.9 M LiPF$_6$, and adding 6 wt % of fluoroethylene carbonate (FEC), 2.5 wt % of 1,3-propanesultone (1,3-PS), and 0.5 wt % of vinylethylene carbonate (VEC) as an additive based on the total weight of the electrolyte thereto.

Comparative Preparation Example 3: Preparation of Electrolyte for Lithium Secondary Battery An electrolyte was prepared by mixing ethylene carbonate (EC), ethylpropionate (EP), and diethyl carbonate (DEC) as a non-aqueous organic solvent in a weight ratio of 3:4:3 (ethylenecarbonate:ethylpropionate:diethylcarbonate), mixing the mixture with 0.9 M LiPF$_6$, and adding 6 wt % of fluoroethylene carbonate (FEC), 2.5 wt % of 1,3-propanesultone (1,3-PS), and 0.5 wt % of vinylethylene carbonate (VEC) as an additive based on the total weight of the electrolyte thereto.

Comparative Preparation Example 4: Preparation of Electrolyte for Lithium Secondary Battery An electrolyte was prepared by mixing ethylene carbonate (EC), ethylpropionate (EP), diethyl carbonate (DEC), and ethylbutanoate represented by Chemical Formula 6 as a non-aqueous organic solvent in a weight ratio of 3:2:3:2 (ethylenecarbonate:ethylpropionate:diethylcarbonate:ethylbutanoate), mixing the mixture with 0.9 M LiPF$_6$, and adding 6 wt % of fluoroethylene carbonate (FEC), 2.5 wt % of 1,3-propanesultone (1,3-PS), and 0.5 wt % of vinylethylene carbonate (VEC) as an additive based on the total weight of the electrolyte thereto.

[Chemical Formula 6]

Example 1: Manufacture of Lithium Secondary Battery Cell

Positive active material slurry was prepared by mixing a LiCoO$_2$ positive active material, a polyvinylidene fluoride binder, and Super-P (MMM company) as a conductive material in a weight ratio of 94:3:3 (LiCoO$_2$:polyvinylidene fluoride:Super-P) in an N-methylpyrrolidone solvent. The positive active material slurry was uniformly coated on a 12 μm-thick aluminum current collector, dried, and compressed to manufacture a positive electrode.

Graphite was used as a negative active material. The graphite (BSG-L)/SBR (BM-440B)/CMC (MAC350, 98/1/1) and a polyamideimide (PAI) binder were mixed in a weight ratio of 90:10 (graphite:polyamideimide) in an N-methylpyrrolidone solvent to prepare negative active material slurry. The negative active material slurry was uniformly coated on a 12 μm-thick copper current collector, dried, and compressed to manufacture a negative electrode.

The positive and negative electrodes, a polyethylene separator (Ashahi), and the electrolyte prepared according to Preparation Example 1 were used to manufacture a 553450 prismatic battery cell in a common method.

Comparative Examples 1 to 4: Manufacture of Lithium Secondary Battery Cell

The positive and negative electrodes according to Example 1, a polyethylene separator (Ashahi), and each electrolyte according to Comparative Preparation Examples 1 to 4 were used to respectively manufacture 553450 prismatic battery cells in a common method. The prismatic battery cells were sequentially called to be Comparative Examples 1 to 4.

Experimental Example 1: Cycle-Life Characteristics

The lithium secondary battery cells according to Example 1 and Comparative Examples 1 to 4 were respectively 120 cycles charged•discharged at 45° C. in a range of 3.0 V to 4.45 V at a 1 C-rate to measure a discharge capacity change and a retained capacity change.

Figure 2:
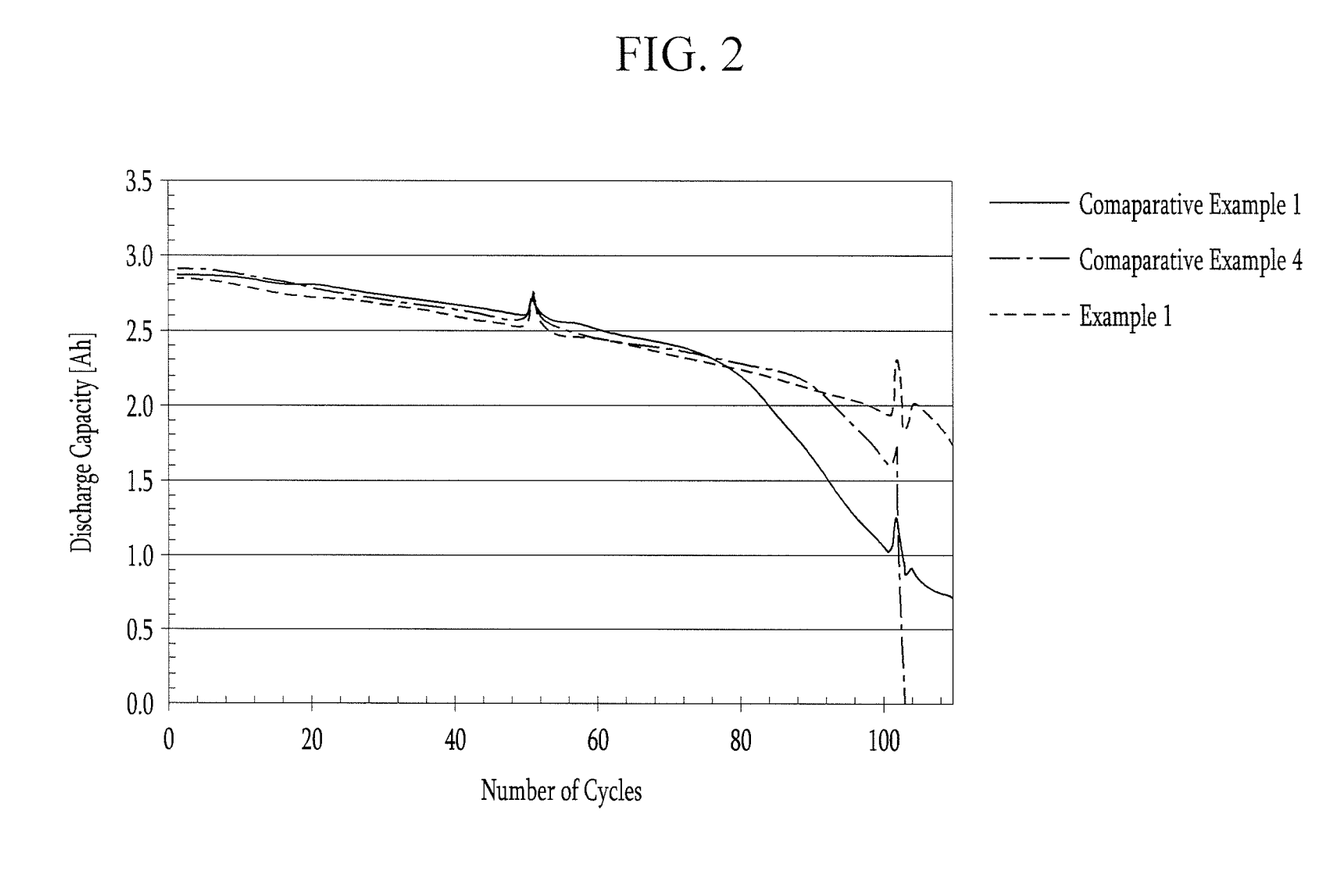
FIG. 2 is a graph showing changes of the discharge capacity of the lithium secondary battery cells manufactured in Example 1, Comparative Example 1, and Comparative Example 4.
Figure 3:
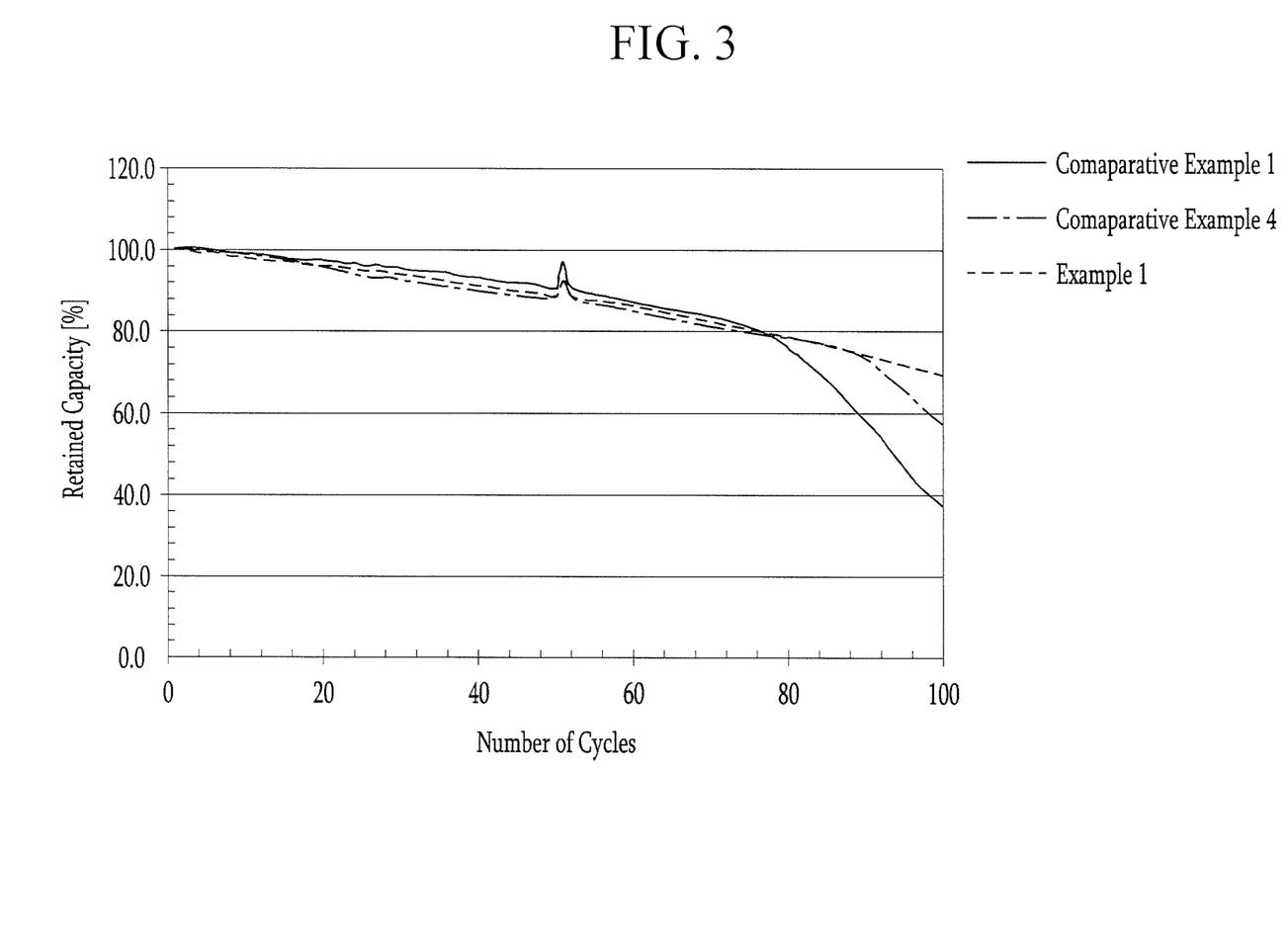
FIG. 3 is a graph showing changes of retained capacity of the lithium secondary battery cells manufactured in Example 1, Comparative Example 1, and Comparative Example 4.

FIG. 2 shows discharge capacity changes of the lithium secondary battery cells according to Example 1 and Comparative Examples 1 and 4, and FIG. 3 shows retained capacity changes of the lithium secondary battery cells according to Example 1 and Comparative Examples 1 and 4.

As shown in FIG. 2, the lithium secondary battery cell according to Example 1 maintained discharge capacity at a considerable level after 100 cycles, the lithium secondary battery cell according to Comparative Example 1 showed sharply deteriorated discharge capacity after 70 cycles, and the lithium secondary battery cell according to Comparative Example 4 showed sharply deteriorated discharge capacity after 80 cycles.

In addition, as shown in FIG. 3, the lithium secondary battery cell according to Example 1 maintained retained capacity at a considerable level after 80 cycles, but the lithium secondary battery cells according to Comparative Examples 1 and 4 showed sharply deteriorated retained capacity after 80 cycles.

Accordingly, the lithium secondary battery cell according to Example 1 showed much excellent cycle-life characteristics at a high voltage and a high temperature compared with the lithium secondary battery cells according to Comparative Examples 1 and 4.

Experimental Example 2: Thickness Variation Ratio and Internal Resistance (IR) Variation Ratio The lithium secondary battery cells according to Example 1 and Comparative Examples 1 to 4 were respectively at allowed to stand in a 45° C. thermostat for one day, once charged•discharged in a range of 3.0 V to 4.45 V at an 1 C-rate, allowed to stand for 6 hours, and once charged•discharged in a range of 3.0 V to 4.45 V at an 1 C-rate in an order. Subsequently, the final rated voltages of the respective lithium secondary battery cells were checked, and then the lithium secondary battery cells were respectively 100 times charged•discharged in a 45° C. thermostat in a range of 3.0 V to 4.45 V at an 1 C-rate.

A thickness variation ratio of each lithium secondary battery cell was measured by using a thickness measurement device, PPG equipment (TesTop, Mitutoyo Corp.) during the entire process, and an internal resistance variation ratio of each lithium secondary battery cell was measured by using an OCV/IR measurement device (Hioki E.E. Corp.).

Figure 4:
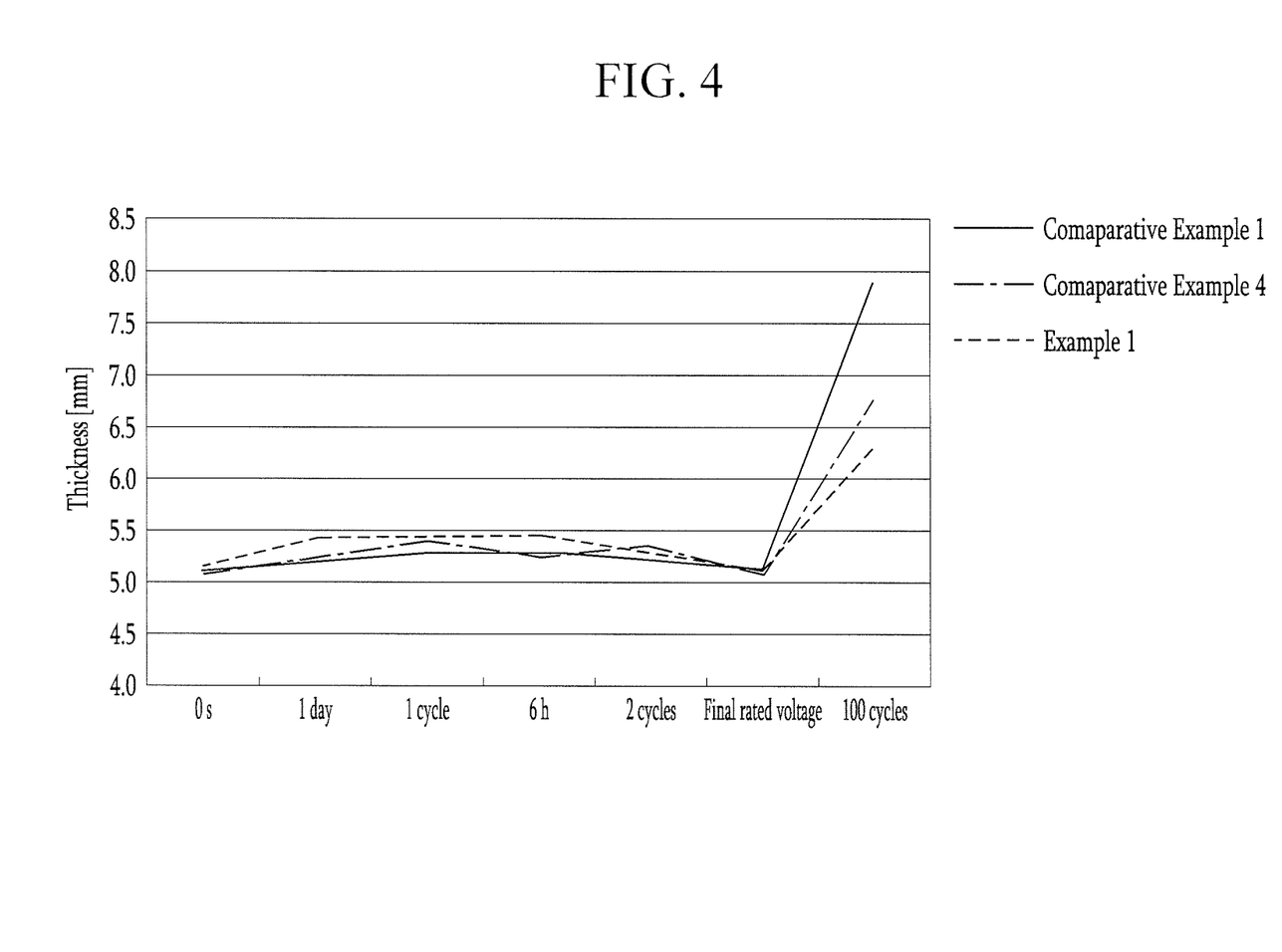
FIG. 4 is a graph showing thickness changes of the lithium secondary battery cells manufactured in Example 1, Comparative Example 1, and Comparative Example 4.
Figure 5:
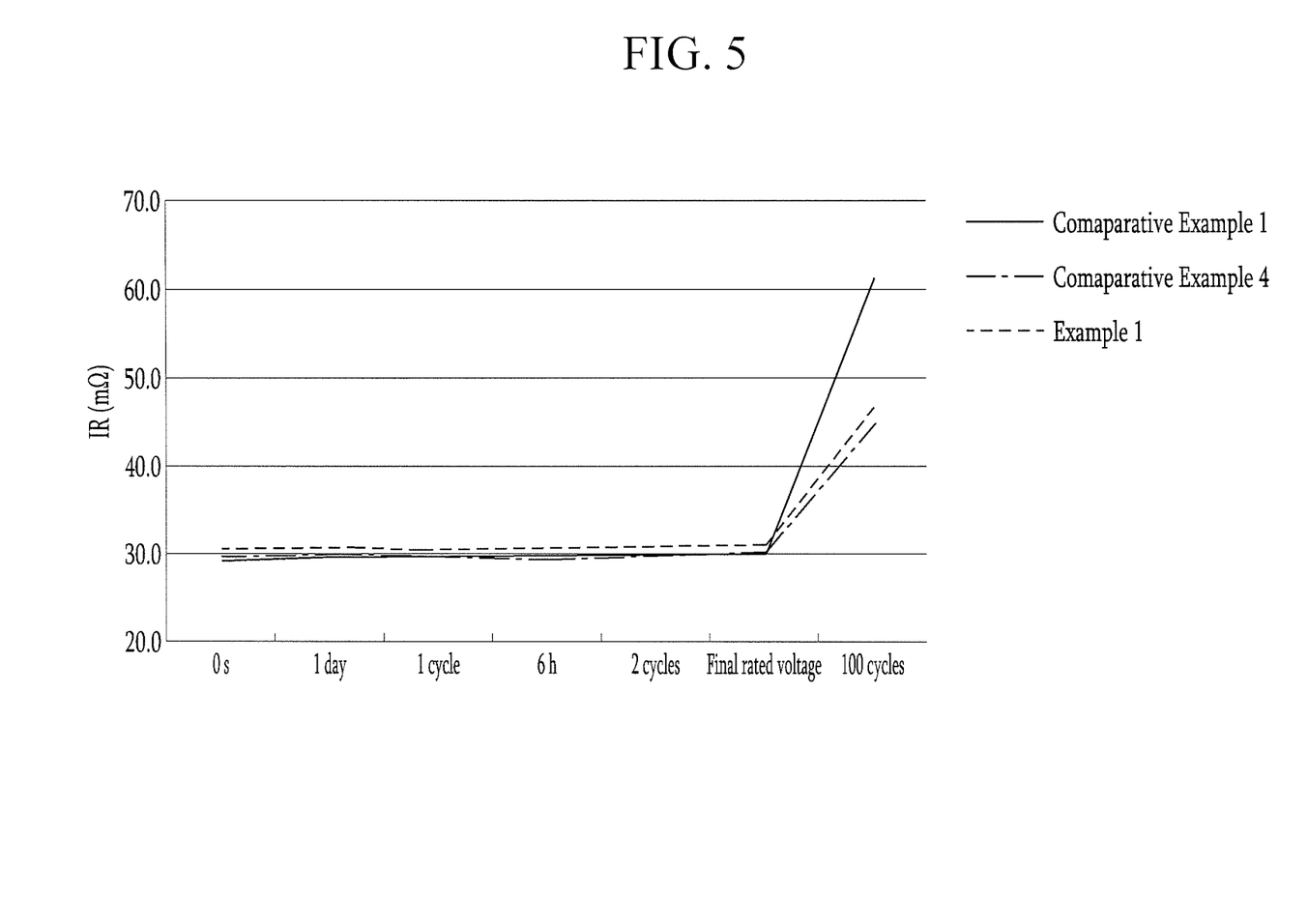
FIG. 5 is a graph showing internal resistance changes of the lithium secondary battery cells manufactured in Example 1, Comparative Example 1, and Comparative Example 4.

FIG. 4 shows a thickness change of each lithium secondary battery cell according to Example 1 and Comparative Examples 1 and 4, and FIG. 5 shows an internal resistance change of each lithium secondary battery cell according to Example 1 and Comparative Examples 1 and 4.

As shown in FIG. 4, the lithium secondary battery cell according to Example 1 showed a thickness expansion ratio of about 22% after 100 cycles, the lithium secondary battery cell according to Comparative Example 1 showed a thickness expansion ratio of about 54% after 100 cycles, and the lithium secondary battery cell according to Comparative Example 4 showed a thickness expansion ratio of about 34% after 100 cycles.

In addition, as shown in FIG. 5, the lithium secondary battery cell according to Example 1 showed an internal resistance increase rate of about 53% after 100 cycles, and the lithium secondary battery cell according to Comparative Example 1 showed an internal resistance increase rate of about 105% after 100 cycles.

Accordingly, the lithium secondary battery cell according to Example 1 was effectively suppressed from a volume expansion and thus showed remarkably excellent cycle-life characteristics at a high voltage and a high temperature compared with the lithium secondary battery cells according to Comparative Examples 1 and 4.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

| <Description of Symbols> | |
| --- | --- |
| 3: lithium secondary battery, | 4: electrode assembly, |
| 5: positive electrode, | 6: negative electrode, |
| 7: separator, | 8: battery case, |
| 11: cap plate | |

The invention claimed is:

1. An electrolyte for a lithium secondary battery, comprising:
a non-aqueous organic solvent including a solvent represented by Chemical Formula 1; and
a lithium salt:

[Chemical Formula 1]

wherein, in Chemical Formula 1,
$R^1$ to $R^4$ are the same or different and are independently a C1 to C5 linear or branched alkyl group.

2. The electrolyte for a lithium secondary battery of claim 1, wherein the solvent represented by Chemical Formula 1 includes one or more of a compound represented by Chemical Formula 2-1, a compound represented by Chemical Formula 2-2, a compound represented by Chemical Formula 2-3, a compound represented by Chemical Formula 2-4, a compound represented by Chemical Formula 2-5, a compound represented by Chemical Formula 2-6, a compound represented by Chemical Formula 2-7, or a compound represented by Chemical Formula 2:

[Chemical Formula 2-1]

[Chemical Formula 2-2]

[Chemical Formula 2-3]

[Chemical Formula 2-4]

[Chemical Formula 2-5]

[Chemical Formula 2-6]

[Chemical Formula 2-7]

[Chemical Formula 2-8]

3. The electrolyte for a lithium secondary battery of claim 1, wherein the non-aqueous organic solvent further includes one or more of a carbonate-based solvent, or a solvent represented by Chemical Formula 3,

[Chemical Formula 3]

wherein, in Chemical Formula 3,
$R^5$ and $R^6$ are the same or different and are independently a C1 to C5 linear alkyl group.

4. The electrolyte for a lithium secondary battery of claim 1, wherein the non-aqueous organic solvent further includes one or more of dimethyl carbonate, diethyl carbonate, dipropyl carbonate, methylpropyl carbonate, ethylpropyl carbonate, methylethyl carbonate, ethylmethyl carbonate, ethylene carbonate, propylene carbonate, or butylene carbonate.

5. The electrolyte for a lithium secondary battery of claim 1, wherein the non-aqueous organic solvent further includes one or more of methylacetate, ethylacetate, n-propylacetate, methylpropionate, ethylpropionate, n-propylpropionate, methylbutanoate, ethylbutanoate, or n-propylbutanoate.

6. The electrolyte for a lithium secondary battery of claim 3, wherein the non-aqueous organic solvent includes 10 to 40 wt % of the solvent represented by Chemical Formula 1 based on a total amount of the non-aqueous organic solvent.

7. The electrolyte for a lithium secondary battery of claim 3, wherein the non-aqueous organic solvent includes the carbonate-based solvent and the solvent represented by Chemical Formula 3 in amounts of 100 to 400 parts by weight of the carbonate-based solvent and 50 to 150 parts by weight of the solvent represented by Chemical Formula 3 based on 100 parts by weight of the solvent represented by Chemical Formula 1.

8. The electrolyte for a lithium secondary battery of claim 1, further comprising one or more of a compound represented by Chemical Formula 5, an alkanesultone, or vinylenecarbonate,

[Chemical Formula 5]

wherein, in Chemical Formula 5,
$R^7$ and $R^8$ are the same or different and are independently hydrogen, halogen, a cyano group, a nitro group, a vinyl group, or a fluorinated C1 to C5 linear or branched alkyl group, provided that both of $R^7$ and $R^8$ are not hydrogen.

9. The electrolyte for a lithium secondary battery of claim 1, further comprising one or more of 1,3-propanesultone, butanesultone, or 1,3-(1-propenesultone).

10. The electrolyte for a lithium secondary battery of claim 8, wherein a combined amount of the one or more of the compound represented by Chemical Formula 5, the alkanesultone, or the vinylenecarbonate is 6 to 13 wt % based on a total weight of the electrolyte for a lithium secondary battery.

11. The electrolyte for a lithium secondary battery of claim 1, further comprising fluoroethylene carbonate, 1,3-propanesultone, and vinylethylene carbonate.

12. The electrolyte for a lithium secondary battery of claim 11, wherein the electrolyte for a lithium secondary battery comprises 1,000 to 2,000 parts by weight of the fluoroethylene carbonate and 100 to 500 parts by weight of the 1,3-propanesultone based on 100 parts by weight of the vinylethylene carbonate.

13. A lithium secondary battery, comprising
a positive electrode including a positive active material;
negative electrode including a negative active material; and
the electrolyte for a lithium secondary battery of claim 1.

14. The lithium secondary battery of claim 13, wherein the positive active material is selected from compounds represented by the following chemical formulae:
$Li_aA_{1-b}D_bE_2$ (wherein, in the chemical formula, $0.90 \le a \le 1.8$, $0 \le b \le 0.5$); $Li_aG_{1-b}D_bO_{2-c}E_c$ (wherein, in the chemical formula, $0.90 \le a \le 1.8$, $0 \le b \le 0.5$, $0 \le c \le 0.05$); $LiG_{2-b}D_bO_{4-c}E_c$ (wherein, in the chemical formula, $0 \le b \le 0.5$, $0 \le c \le 0.05$); $Li_aNi_{1-b-c}Co_bD_cE_\alpha$ (wherein, in the chemical formula, $0.90 \le a \le 1.8$, $0 \le b \le 0.5$, $0 \le c \le 0.05$, $0 \le \alpha \le 2$); $Li_aNi_{1-b-c}Co_bD_cO_{2-\alpha}J_\alpha$ (wherein, in the chemical formula, $0.90 \le a \le 1.8$, $0 \le b \le 0.5$, $0 \le c \le 0.05$, $0 \le \alpha \le 2$); $Li_aNi_{1-b-c}Co_bD_cO_{2-\alpha}J_2$ (wherein, in the chemical formula, $0.90 \le a \le 1.8$, $0 \le b \le 0.5$, $0 \le c \le 0.05$, $0 < \alpha < 2$); $Li_aNi_{1-b-c}Mn_bD_cE_\alpha$, (wherein, in the chemical formula, $0.90 \le a \le 1.8$, $0 \le b \le 0.5$, $0 \le c \le 0.05$, $0 < \alpha \le 2$); $Li_aNi_{1-b-c}Mn_bD_cO_{2-\alpha}J_\alpha$ (wherein, in the chemical formula, $0.90 \le a \le 1.8$, $0 \le b \le 0.5$, $0 \le c \le 0.05$, $0 \le \alpha \le 2$); $Li_aNi_{1-b-c}Mn_bD_cO_{2-\alpha}J_2$ (wherein, in the chemical formula, $0.90 \le a \le 1.8$, $0 \le b \le 0.5$, $0 \le c \le 0.05$, $0 < \alpha < 2$); $Li_aNi_bG_cL_dO_2$ (wherein, in the chemical formula, $0.90 \le a \le 1.8$, $0 \le b \le 0.9$, $0 \le c \le 0.5$, $0.001 \le d \le 0.2$); $Li_aNi_bG_cO_2$ (wherein, in the chemical formula, $0.90 \le a \le 1.8$, $0 \le b \le 0.9$, $0 \le c \le 0.5$); $Li_aNi_bCo_cMn_dL_eO_2$ (wherein, in the chemical formula, $0.90 \le a \le 1.8$, $0 \le b \le 0.9$, $0 \le c \le 0.5$, $0 \le d \le 0.5$, $0.001 \le e \le 0.2$); $Li_aNi_bCo_cMn_dO_2$ (wherein, in the chemical formula, $0.90 \le a \le 1.8$, $0 \le b \le 0.9$, $0 \le c \le 0.5$, $0 \le d \le 0.5$); $Li_aNiL_bO_2$ (wherein, in the chemical formula, $0.90 \le a \le 1.8$, 0.001≤b≤0.2); Li$_a$CoL$_b$O$_2$ (wherein, in the chemical formula, 0.90≤a≤1.8, 0.001≤b≤0.2); Li$_a$MnL$_b$O$_2$ (wherein, in the chemical formula, 0.90≤a≤1.8, 0.001≤b≤0.2); Li$_a$Mn$_2$L$_b$O$_4$ (wherein, in the chemical formula, 0.90≤a≤1.8, 0.001≤b≤0.2); Li$_a$Mn$_2$O$_4$ (wherein, in the chemical formula, 0.90≤a≤1.8); MO$_2$; MS$_2$; LiMS$_2$; V$_2$O$_5$; LiV$_2$O$_5$; LiQO$_2$; LiNiVO$_4$; Li$_{(3-f)}$T$_2$PO$_{43}$ (wherein, in the chemical formula, 0≤f≤2); Li$_{(3-f)}$Fe$_2$PO$_{43}$ (wherein, in the chemical formula, 0≤f≤2); LiFePO$_4$, wherein, in the chemical formulae, A is Ni, Co, Mn, or a combination thereof, D is Al, Ni, Co, Mn, Cr, Fe, Mg, Sr, V, a rare earth element, or a combination thereof, E is O, F, S, P, or a combination thereof, G is Co, Mn, or a combination thereof, J is F, S, P, or a combination thereof, L is Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Mn, La, Ce, or a combination thereof, M is Ti, Mo, Mn, or a combination thereof, Q is Cr, V, Fe, Sc, Ti, Y, or a combination thereof, and T is V, Cr, Mn, Co, Ni, Cu, or a combination thereof.

15. The lithium secondary battery of claim 14, wherein the positive active material is LiCoO$_2$.

16. The lithium secondary battery of claim 13, wherein the negative active material is graphite.

17. The lithium secondary battery of claim 13, wherein the lithium secondary battery has a charge voltage of 4.3V or greater.

18. The lithium secondary battery of claim 17, wherein the lithium secondary battery has a charge voltage of 4.4V to 4.5 V.

19. The electrolyte for a lithium secondary battery of claim 1, wherein the solvent represented by Chemical Formula 1 includes one or more of a compound represented by Chemical Formula 2-2, a compound represented by Chemical Formula 2-3, a compound represented by Chemical Formula 2-4, a compound represented by Chemical Formula 2-5, a compound represented by Chemical Formula 2-6, a compound represented by Chemical Formula 2-7, or a compound represented by Chemical Formula 2-8:

[Chemical Formula 2-2]

[Chemical Formula 2-3]

[Chemical Formula 2-4]

[Chemical Formula 2-5]

[Chemical Formula 2-6]

[Chemical Formula 2-7]

[Chemical Formula 2-8]

* * * * *